United States Patent

Gerhardt et al.

(10) Patent No.: US 6,516,964 B1
(45) Date of Patent: Feb. 11, 2003

(54) FUEL TANK

(75) Inventors: Marc Gerhardt, Dortmund (DE); Christian Kochsmeier, Dortmund (DE); Peter Andreas Löw, Robdorf (DE); Thomas Zapp, Dortmund (DE); Dieter Keller, Aschaffenburg (DE)

(73) Assignee: Mannesmann VDO AG, Frankfurt am Main (DE)

( * ) Notice: Subject to any disclaimer, the term of this patent is extended or adjusted under 35 U.S.C. 154(b) by 0 days.

(21) Appl. No.: 09/722,874

(22) Filed: Nov. 27, 2000

(30) Foreign Application Priority Data

Nov. 27, 1999 (DE) .......................... 199 57 253

(51) Int. Cl.[7] .............................................. B60K 15/03
(52) U.S. Cl. .................. 220/4.14; 220/258.1; 220/288; 220/327; 220/304
(58) Field of Search ................ 220/562, 582, 220/4.13, 4.14, 4.15, 601, 625, 661, 676, 692, 693, 327, 328, 288, 258.1, 278, 266, 265

(56) References Cited

U.S. PATENT DOCUMENTS

| 1,540,554 A | * | 6/1925 | Griffiths ..................... 220/601 |
|---|---|---|---|
| 1,569,881 A | * | 1/1926 | Reid |
| 1,748,138 A | * | 2/1930 | McBride ..................... 220/582 |
| 3,339,812 A | * | 9/1967 | Meissner ..................... 220/278 |
| 4,212,318 A | * | 7/1980 | Warmbold ..................... 220/288 |
| 4,589,564 A | * | 5/1986 | Olster et al. ..................... 220/327 |
| 4,747,501 A | * | 5/1988 | Greaves ..................... 220/266 |
| 5,292,025 A | * | 3/1994 | Dubreul ..................... 220/278 |
| 5,351,718 A | * | 10/1994 | Barton |
| 5,481,790 A | * | 1/1996 | Koreis et al. ..................... 220/327 |
| 5,509,567 A | * | 4/1996 | Lindahl ..................... 220/601 |
| 5,520,156 A | * | 5/1996 | Brunnhofer |
| 5,909,818 A | * | 6/1999 | Bateman ..................... 220/601 |
| 5,947,315 A | * | 9/1999 | Valyi et al. ..................... 220/258.1 |
| 6,179,145 B1 | * | 1/2001 | Roth ..................... 220/4.13 |

FOREIGN PATENT DOCUMENTS

| EP | 799738 | * | 10/1997 |
| FR | 2596333 | * | 10/1987 |
| WO | 99/56977 | * | 11/1999 |

* cited by examiner

*Primary Examiner*—Nathan J. Newhouse
(74) *Attorney, Agent, or Firm*—Mayer, Brown, Rowe & Maw

(57) ABSTRACT

In a fuel tank (1) with a plug which is to be opened, in particular, during maintenance work, a plugging part (6) is fastened in a trough-like depression (2) of the wall of the fuel tank (1) by means of a nut (7). The nut (7) has a thread (9) intended for tapping into a bead (5) of the fuel tank (1). As a result, the fuel tank (1) can be manufactured particularly cost-effectively from geometrically simple parts.

10 Claims, 1 Drawing Sheet

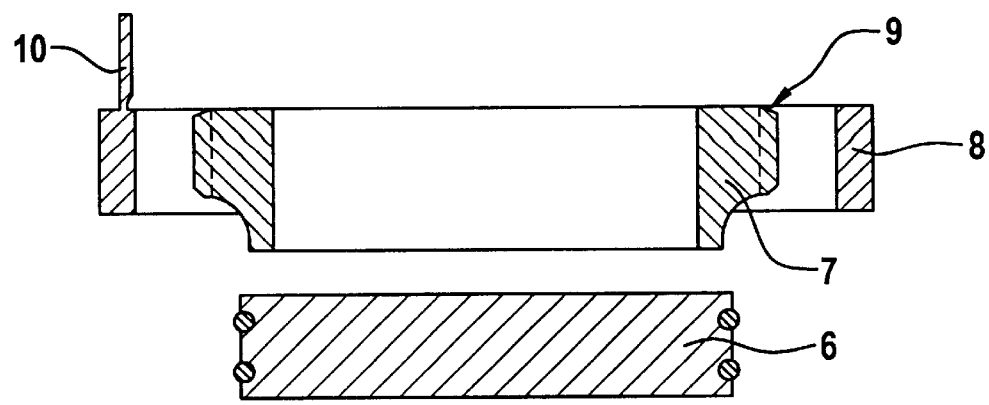
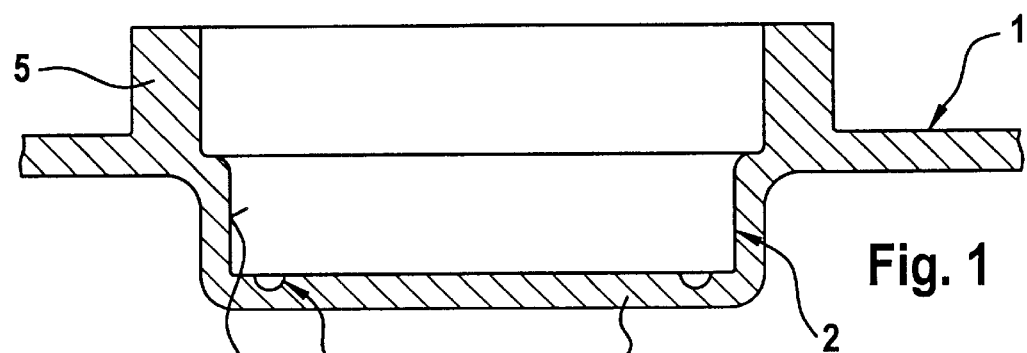
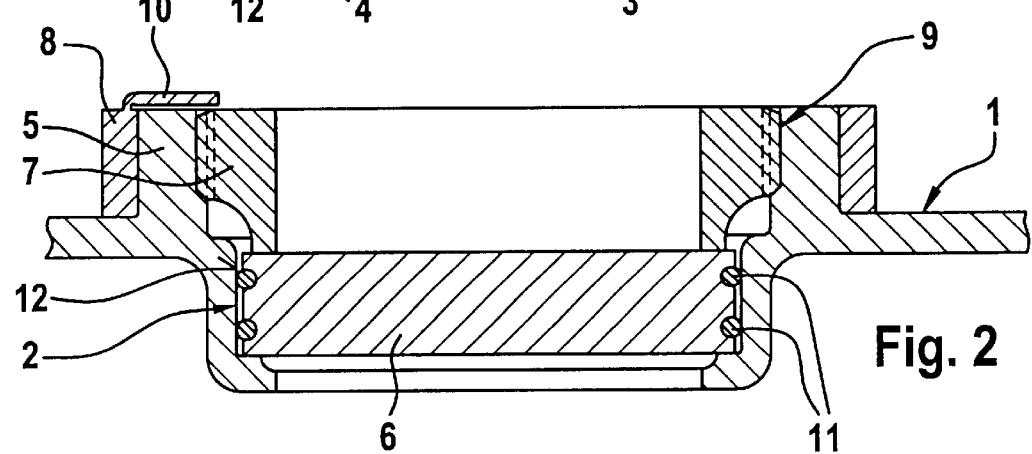
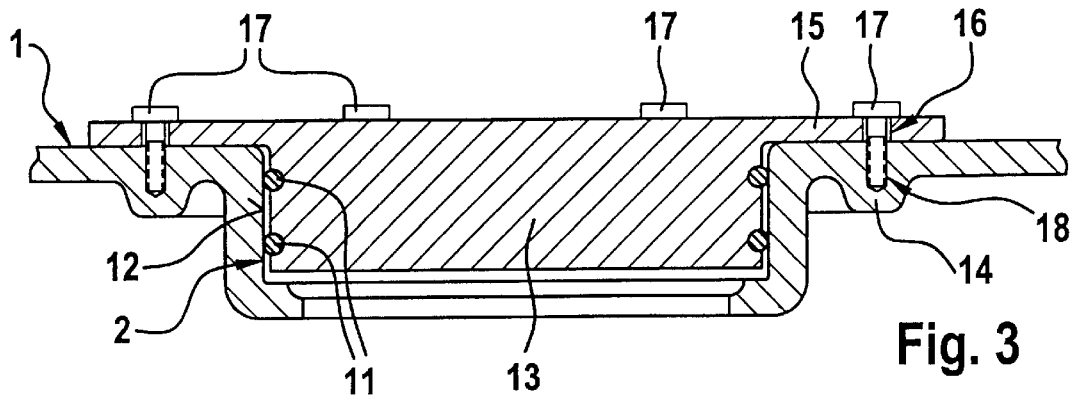

FUEL TANK

BACKGROUND OF THE INVENTION

1. Field of the Invention

The invention relates to a fuel tank with a plug which is to be opened, in particular, during maintenance work and which, in the case of first use, is manufactured in one piece with the fuel tank or is connected in a materially integral manner to the latter and has holding means for a plugging part positively connectable to the fuel tank.

2. Description of the Related Art

Such fuel tanks are usually manufactured from shell parts welded to one another and are known from practice. Components, such as, for example, suction jet pumps or a fuel feed unit, which are to be used in the fuel tank, are mounted on the inner faces of the shell parts before these are welded together. The plug is designed as part of the wall of the fuel tank and is delimited, for example, by a peripheral groove. After welding, the components are arranged within the fuel tank. In the event of maintenance, the plug can be detached from the fuel tank. After the maintenance work has ended, the orifice formed as a result of the removal of the plug is closed by means of the plugging part delivered as an accessory together with the fuel tank. For this purpose, the fuel tank has a connection piece which is located below the orifice formed by the plug and which has a thread arranged on it. The initially completely closed configuration of the fuel tank has the advantage that an escape of fuel vapors out of the fuel tank when the latter is in its new state is kept particularly low. The relatively low emission of fuel vapors, which is unavoidable in the case of a reusable plug, therefore occurs only in the unlikely event of maintenance.

One disadvantage of the known fuel tank is that the connection piece provided for connecting to the plugging part and having the thread is a molding which is difficult to manufacture in geometric terms. The fuel tank is therefore highly cost-intensive to manufacture.

The problem on which the invention is based is to design a fuel tank of the type initially mentioned, in such a way that it can be produced particularly cost-effectively.

SUMMARY OF THE INVENTION

This problem is solved, according to the invention, in that the fuel tank is designed, in the region of the plug, for tapping a thread intended for fastening the plugging part.

By virtue of this design, the fuel tank according to the invention can be composed of geometrically simple shell parts. Since the thread for fastening the plugging part is generated during the assembly of such a fuel tank, the fuel tank according to the invention does not require a preformed thread. The fuel tank according to the invention can thereby be composed in each case of moldings of geometrically simple design. The individual moldings may, for example, in each case be produced in axial-removal injection molds. As a result, the fuel tank according to the invention can be produced particularly cost-effectively. The fuel tank according to the invention may, for example, be manufactured in one piece with the plug in the same way as the known fuel tank. Alternatively to this, the fuel tank according to the invention may also first be provided with an assembly orifice and the plug be adhesively bonded or welded to the fuel tank.

That region of the fuel tank according to the invention which is intended for tapping a thread has particularly high stability if the fuel tank has an annular bead running peripherally around the plug in the new state.

According to another advantageous development of the invention, the mounting of the plugging part is particularly simple if the thread is arranged on a nut to be screwed into the bead and intended for holding the plugging part.

According to another advantageous development of the invention, canting or tilting of the plugging part can be reliably avoided if the plugging part has a flange with a plurality of individual screws to be screwed into the fuel tank.

If, according to another advantageous development, the thread is designed to be selftapping, there is no need for a special tool in order to generate it in the fuel tank.

According to another advantageous development of the invention, an identification of the plug and of the limitation of the plug can be determined in a simple way if the plug is arranged in the bottom region of a trough-like depression.

An escape of fuel vapors out of the fuel tank according to the invention when the plug is detached and the plugging part is mounted can be kept particularly low if the trough-like depression has on its wall a sealing face intended for supporting sealing elements of the plugging part.

According to another advantageous development of the invention, damage to the bead when the plug is being detached can be reliably avoided if the bead is arranged in that region of the fuel tank which is adjacent to the trough-like depression.

The bead can easily be seen during the mounting of the plugging part if the bead is arranged on the outside of the fuel tank. This avoids the situation where the plugging part is fastened next to the bead.

According to another advantageous development of the invention, a supporting ring surrounding the bead can reliably prevent the bead from moving away laterally when the plugging part having the external thread is being screwed in.

According to another advantageous development of the invention, a release of the supporting ring and therefore of the plugging part can be reliably prevented if the supporting ring and the plugging part are connected to one another via an antiloss device. This antiloss device may be designed, for example, as a tongue arranged on one of the components and capable of being folded round against the other component.

According to another advantageous development of the invention, distortion of the sealing face in the trough-like depression when the plugging part is being fastened can be avoided in a simple way if the bead is arranged on the inside of the fuel tank and is at a slight distance from the trough-like depression. This leads, particularly when the plugging part is to be screwed to the fuel tank according to the invention via a plurality of screws, to the fuel tank according to the invention being leaktight permanently and to a high degree.

The invention permits numerous embodiments. In order to make its basic principle even clearer, two of these are illustrated in the drawing and are described below. In the drawing:

BRIEF DESCRIPTION OF THE DRAWINGS

FIG. 1 shows a sectional illustration of a part region of a wall of a fuel tank according to the invention with a plug and with a plugging part, FIG. 2 shows the fuel tank from FIG. 1 with the plugging part mounted, FIG. 3 shows a sectional illustration through a further embodiment of the fuel tank with a mounted plugging part.

DETAILED DESCRIPTION OF THE PREFERRED EMBODIMENT

FIG. 1 shows a sectional illustration through the wall of a fuel tank 1 in the region of a plug 3 arranged in a trough-like depression 2. The plug 3 is arranged in the bottom region of the trough-like depression 2 and is manufactured in one piece with the fuel tank 1. As a result, fuel vapors cannot escape out of the fuel tank 1. A peripheral groove 4 arranged in the bottom region of the trough-like depression 2 serves as a marking and predetermined breaking point for the plug 3. Consequently, in the event of maintenance, the plug 3 can simply be detached from the fuel tank 1 along the groove 4. The fuel tank 1 has on its outside a bead 5 running peripherally around the trough-like depression 2. After the plug 3 has been detached, a plugging part 6 is inserted sealingly into the trough-like depression 2 and is held by means of a nut 7 and a supporting ring 8.

FIG. 2 shows the fuel tank 1 from FIG. 1 after the plug 3 has been detached and the plugging part 6 inserted. It is necessary for the plug 3 illustrated in FIG. 1 to be detached, for example, when components (not illustrated), such as, for example, a feed unit, which are arranged within the fuel tank 1, have to be maintained or exchanged. The nut 7 has on its outside a thread 9 by means of which said nut is screwed into the bead 5. The bead 5 is held radially on the outside by the supporting ring 8. Moreover, an antiloss device 10 designed as a tongue is arranged on the supporting ring 8. When the plugging part 6 is in the mounted state, the antiloss device 10 bears on the nut 7. The plugging part 6 is disk-shaped and on its outer surface has two annular sealing elements 11. The sealing elements 11 bear on a sealing face 12 arranged on the inside of the trough-like depression 2. An escape of fuel vapors out of the fuel tank 1 is thereby kept particularly low.

FIG. 3 shows a further embodiment of the fuel tank 1 according to the invention with a plugging part 13 inserted into the trough-like depression 2. The trough-like depression 2 has, in its bottom region an orifice which, in the new state, was closed by the plug 3 illustrated in FIG. 1. The fuel tank 1 has on its inside a bead 14 running peripherally around the trough-like depression 2. The plugging part 13 has a flange 15 on its side forming the outer face of the fuel tank 1 and is fastened to the fuel tank 1 by means of a plurality of screws 17 led through bores 16 of the flange 15 and screwed into the bead 14. The bead 14 serves for reinforcing that region of the fuel tank 1 which is designed for screwing together. The screws 17 each have a selftapping thread 18.

What is claimed is:

1. A fuel tank comprising:

a wall having a plug integrally formed with the fuel tank or connected in a materially integral manner to the fuel tank, in a plug region; said plug region having a bead for tapping a thread in a manner adapted to fasten a plugging part to the fuel tank wall, said bead located peripherally around the plug and a thread arranged on a nut to be screwed into the bead for fastening the plugging part to the fuel tank wall.

2. The fuel tank as claimed in claim 1, wherein the thread is self-tapping.

3. The fuel tank as claimed in claim 1, wherein the plug is arranged in a bottom region of a depression in a wall of the fuel tank.

4. The fuel tank as claimed in claim 3, wherein the depression has a sealing face for engagement with sealing elements of the plugging part.

5. The fuel tank as claimed in claim 4, wherein a bead is arranged adjacent to the depression.

6. The fuel tank as claimed in at claim 1, wherein the bead is arranged on the outside of the fuel tank.

7. The fuel tank as claimed in claim 6, further comprising a supporting ring surrounding the bead.

8. The fuel tank as claimed in claim 7, wherein the supporting ring further comprises an antiloss device for holding the plugging part in an installed position.

9. A fuel tank comprising:

a wall having a plug integrally formed with the fuel tank or connected in a materially integral manner to the fuel tank, in a plug region; said plug region having a bead for tapping a thread in a manner adapted to fasten a plugging part to the fuel tank wall, wherein the plugging part has a flange adapted to be secured with screws to the fuel tank wall in the plug region.

10. The fuel tank as claimed in claim 9, wherein the bead is arranged on the inside of the fuel tank and is at a slight distance from the depression.

\* \* \* \* \*